United States Patent
Voelz et al.

(10) Patent No.: US 10,151,385 B2
(45) Date of Patent: Dec. 11, 2018

(54) TRANSMISSION DEVICE AND METHOD FOR TRANSMITTING AN ACTUATING ANGLE OF A SELECTOR LEVER FOR A SHIFTING ACTUATION FOR A VEHICLE TRANSMISSION

(71) Applicant: ZF Friedrichshafen AG, Friedrichshafen (DE)

(72) Inventors: Michael Voelz, Diepholz (DE); Dirk Bormann, Bissendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 319 days.

(21) Appl. No.: 15/115,103

(22) PCT Filed: Dec. 15, 2014

(86) PCT No.: PCT/EP2014/077718
§ 371 (c)(1),
(2) Date: Jul. 28, 2016

(87) PCT Pub. No.: WO2015/113692
PCT Pub. Date: Aug. 6, 2015

(65) Prior Publication Data
US 2016/0377174 A1  Dec. 29, 2016

(30) Foreign Application Priority Data

Jan. 28, 2014 (DE) ........................ 10 2014 201 477

(51) Int. Cl.
*F16H 59/10* (2006.01)
*F16H 61/22* (2006.01)
*F16H 59/02* (2006.01)

(52) U.S. Cl.
CPC ........... *F16H 59/105* (2013.01); *F16H 61/22* (2013.01); *F16H 2059/026* (2013.01)

(58) Field of Classification Search
CPC ... F16H 59/105; F16H 61/22; F16H 2059/026
See application file for complete search history.

(56) References Cited

U.S. PATENT DOCUMENTS 2,951,392 A * 9/1960 Backus ................. F16H 3/0915
74/473.23
4,873,883 A  10/1989 Venant
(Continued)

FOREIGN PATENT DOCUMENTS

DE  196 08 981 A1  9/1997
DE  102 31 015 A1  3/2004
(Continued)

OTHER PUBLICATIONS

International Search Report and Written Opinion of the International Search Authority dated Apr. 1, 2015 in International Application No. PCT/EP2014/077718 (English and German languages) (11 pp.).

(Continued)

*Primary Examiner* — David M Fenstermacher
(74) *Attorney, Agent, or Firm* — Brinks Gilson & Lione

(57) ABSTRACT

A transmission device may be provided for transmitting an angle of activation of a selector lever for a vehicle transmission, where the selector lever can assume a plurality of angles of activation. The transmission device may include a transmission lever, where the transmission lever may be rotatable about a first axis and may be configured to receive the angle of activation of the selector lever. The transmission device may further include a signal lever, where the signal lever may be rotatable about a second axis and may be configured to provide a transducer angle to a transmitter element of a sensor. A drive device may be included. The drive device may couple the transmission lever with the signal lever and may be configured to transmit the angle of (Continued)

activation received by the transmission lever to the transducer angle provided by the signal lever.

20 Claims, 8 Drawing Sheets

(56) References Cited

U.S. PATENT DOCUMENTS

| | | | | |
|---|---|---|---|---|
| 5,052,239 A | * | 10/1991 | Ubagai | F16H 61/26 74/473.36 |
| 5,125,285 A | * | 6/1992 | Sagara | F16H 61/26 180/374 |
| 5,560,253 A | * | 10/1996 | Ishikawa | B60K 20/04 403/330 |
| 5,743,148 A | * | 4/1998 | Na | F16H 59/04 74/469 |
| 5,927,151 A | * | 7/1999 | Alber | F16C 11/0619 74/473.29 |
| 6,109,414 A | * | 8/2000 | Tomida | F16H 59/10 192/220.7 |
| 6,435,054 B1 | * | 8/2002 | Duckeck | B60K 20/04 74/473.15 |
| 6,951,151 B2 | * | 10/2005 | Ryu | F16H 59/042 180/336 |
| 9,551,417 B2 | * | 1/2017 | Piazza | F16H 61/16 |

FOREIGN PATENT DOCUMENTS

| | | |
|---|---|---|
| DE | 10 2006 044 404 A1 | 3/2007 |
| DE | 10 2006 021 078 B3 | 8/2007 |
| DE | 10 2007 032 545 A1 | 11/2008 |
| DE | 10 2009 039 113 A1 | 3/2011 |
| DE | 10 2010 028 965 A1 | 11/2011 |

OTHER PUBLICATIONS

German Search Report dated Nov. 4, 2014 for German Patent Application No. 10 2014 201 477.8 (German language with two-page English explanations) (11 pp.).

* cited by examiner

TRANSMISSION DEVICE AND METHOD FOR TRANSMITTING AN ACTUATING ANGLE OF A SELECTOR LEVER FOR A SHIFTING ACTUATION FOR A VEHICLE TRANSMISSION

This application is a filing under 35 U.S.C. § 371 of International Patent Application PCT/EP2014/077718, filed Dec. 15, 2014, and claims the priority of German Patent Application 10 2014 201477.8, filed Jan. 28, 2014. These applications are incorporated by reference herein in their entireties.

TECHNICAL FIELD

The present invention relates to a transmission device for transmitting an angle of activation of a selector lever for a shift actuation of a vehicle transmission, a method for producing a respective transmission device, as well as a method for transmitting an angle of activation of a selector lever for a shift actuation of a vehicle transmission.

BACKGROUND

Usually, in a vehicle transmission, the selection of transmission ratio steps or control of switching programs takes place by means of an actuating device arranged in the reaching re o the hands of the driver. For this purpose, actuating elements, such as gearshift levers or selector levers, are used, which are arranged between the front seats, in the area of the steering wheel or in different areas of the vehicle interior. Usually, shift actuations are developed in accordance with a specific vehicle model to fulfill the different requirements regarding accessibility and ergonomics, as well as the resulting angles of activation. At the same time, it is important to consider for installation. A variation of well-known actuating devices is achieved by designing different components specifically for the particular variation type.

The patent specification DE 102010 028965 A1 relates to an actuating device for selecting gear stages of a vehicle transmission, which comprises a lever housing, a selector lever, as well as a transmission device for transmitting shift commands to the transmission. The actuating device is characterized by an exchangeable module adapter, which is arranged between the lever housing and the transmission device. The module adapter is used to adapt the ergonomics point of the actuating device in the vertical and/or horizontal direction and thus to different installation situations.

BRIEF SUMMARY

Against this background, the present disclosure provides an improved transmission device for transmitting an angle of activation of a selector lever for a shift actuation of a vehicle transmission, a method for producing a respective transmission device for transmitting an angle of activation of a selector lever for a shift actuation of a vehicle transmission, as well as a method for transmitting an angle of activation of a selector lever for a shift actuation of a vehicle transmission. Advantageous embodiments are included in following description.

By means of a thrust-loaded transmission, an angular position of an actuating element or selector lever can be transmitted to a sensor device, wherein a configurable force application point of the pivot bearing of the thrust-loaded transmission can cause on one of the levers a change in transmission. At the same time, the actuating element can cause a rotation of a transmission lever, wherein the rotation or deflection of the transmission lever is transmitted to a second lever, which is equipped with a sensor or which responds to a sensor. In the process, it is important that a transmission or a proportional value can be adjusted when the rotation or deflection of the transmission lever is transmitted to the second lever.

A transmission device for transmitting an angle of activation of a selector lever for a shift actuation of a vehicle transmission comprises: a transmission lever, which is pivoted about a first axis to receive the angle of activation of the selector lever; a signal lever, which is pivoted about a second axis to provide a transducer angle for a transmitter element of a sensor; and a drive device, which couples the transmission lever with the signal lever to transmit the angle of activation to the transducer angle of the signal lever, wherein a force application point between the transmission lever and the signal lever can be configured to adjust a proportional value between the angle of activation and the transducer angle.

A vehicle, especially a motor vehicle, can comprise a transmission or vehicle transmission. The vehicle transmission can have a plurality of transmission steps or shifting programs. A selection of a transmission step of the plurality of transmission steps or a selection of a shifting program of the plurality of shifting programs can be performed by means of a selector lever. For this purpose, the selector lever can assume a plurality of angles of activation. An angle of activation can be assigned a transmission step or a shifting program of the vehicle transmission. Usually, a selector lever involves an actuating device or a gearshift lever. The transmission lever can have an interface to receive the angle of activation of the selector lever. The first axis and the second axis can be spaced apart. The first axis and the second axis can be aligned in parallel at a tolerance range. The angle of activation and the transducer angle can be arranged proportional to each other. For example, the transducer angle can be set to respond to the angle of activation and a proportional value. The force application point of the drive device can be firmly connected with the transmission lever and simultaneously or additionally with the signal lever.

The drive device can comprise a coupling element and a guide unit for the coupling element. In particular, the drive device can comprise a linear guide unit. At the same time, the coupling element can be arranged in a receptacle at the transmission lever, and the guide unit can be arranged at the signal lever. In an alternative embodiment, the coupling element can be arranged in a receptacle at the signal lever, and the guide unit can be arranged at the transmission lever. The guide unit can be connected in form-fitting manner and additionally or alternatively in force-fitting manner with the transmission lever or the signal lever. The coupling element can engage in the guide unit. The guide unit can be designed in the form of a groove, a profile or a track.

The coupling element can be designed in the form of a pin or a bolt or can comprise a pin or a bolt. The coupling element can also be designed in the form of a pin or bolt with a sliding component. For example, the coupling element can be designed in the form of a push-in pin, a screw or a connector pin. The coupling element can move in the guide unit along a predetermined guide track. At the same time, the guide track can have a linear design. When the coupling element is designed in the form of a pin or bolt, one side of the coupling element can be arranged in the receptacle in the transmission lever or signal lever, and the other side can be guided in the guide unit. As a result, the angles of both levers can change in relation to each other. The angle of activation and the transducer angle can be different from one another. Alternatively, a pin or bolt can also be combined with a sliding component. As a result, the sliding component can glide in the guide unit. The sliding component can have a pivot bearing, in which part of the pin or bolt is arranged. Furthermore, the sliding component can comprise at least one slide bearing.

It is also advantageous when the transmission lever has at least one further receptacle. The at least one further receptacle and the at least one receptacle can be arranged radially to the rotation axis of the transmission lever. The receptacle and the further receptacle can each be spaced differently from the first axis. At the same time, the coupling element can be arranged in the at least one receptacle and in addition or alternatively in the at least one further receptacle. In an alternative embodiment, the signal lever can have one receptacle and at least one further receptacle, wherein the coupling element can be arranged in the receptacle or alternatively in the at least one further receptacle. By means of two receptacles placed at different locations, i.e., spaced at different locations in relation to the assigned axis, the proportional value between the angle of activation and the transducer angle can be configured or adjusted.

Furthermore, it is possible to arrange at least one magnet at the signal lever to be used as a transmitter element. In an alternative embodiment, a transmitter element in the form of a sensor can be arranged at the signal lever. When a magnet is used as transmitter element and arranged at the signal lever, a position or an angle, especially the transducer angle of the signal lever, can be detected easily and cost-effectively by a sensor, a plurality of sensors or a sensor field.

Next to the signal lever, it is possible to arrange a circuit board. The circuit board can comprise at least one sensor. The at least one sensor can be integrated in the circuit board or arranged on the circuit board. The circuit board can have a sensor field or a plurality of sensors. The transmitter element can be moved along a circular path over the circuit board in a plane that is in a tolerance range parallel to the circuit board. The at least one sensor or the sensor field can be designed to set a position of the transmitter element or a transducer angle of the signal lever. A signal of the at least one sensor or the sensor field can represent a position of the transmitter element, a transducer angle, a transmission step or a shifting program of the vehicle transmission.

Furthermore, the transmission device can comprise a locking device, which is designed to block in a locked condition a movement of the transmission lever and in addition or alternatively the signal lever. For this purpose, the locking device is able in locked condition to engage in a locking recess of the transmission lever. For example, the transmission lever and in addition or alternatively the signal lever can have a recess or a drill hole into which a locking device can engage. The locking device can be moved mechanically or electrically and can be moved into a position which blocks the transmission lever or signal lever in a rotational movement or angular change.

It is also advantageous when in one embodiment the transmission device has a housing. As a result, it is possible to support with the use of the housing the first axis and additionally or alternatively the second axis. The first axis and additionally or alternatively the second axis can be supported at the housing. A housing can protect the transmission device. A housing can also provide an easy assembly of a pre-assembled transmission device.

A method for producing a transmission device for transmitting an angle of activation of a selector lever for a shift actuation of a vehicle transmission comprises the following steps: providing a transmission lever, a signal lever and a drive device; configuring a force application point of the drive device between the transmission lever and the signal lever to adjust a proportional value between the angle of activation and a transducer angle of the signal lever; and arranging the transmission lever, the drive device and the signal lever, wherein the transmission lever for assuming the angle of activation of the selector lever is pivoted about a first axis, wherein the signal lever for providing the transducer angle for a transmitter element of a sensor is pivoted about a second axis, and wherein the drive device couples the transmission device with the signal lever to transmit the angle of activation to the transducer angle of the signal lever.

The present embodiments can also be cost-effectively and effectively implemented by means of a method for producing a transmission device for transmitting an angle of activation of a selector lever to a transducer angle for a shift actuation of a vehicle transmission. In the step of configuration, an element of the drive device, such as a bolt or a pin, can be arranged in a receptacle of the transmission lever to adjust the proportional value between the angle of activation and the transducer angle of the signal lever.

A method for transmitting an angle of activation of a selector lever for a shift actuation of a vehicle transmission comprises the following steps: rotating the transmission lever about a first axis in response to an actuation of the selector lever to adjust an angle of activation; transmitting the movement of the transmission lever to a signal lever, wherein the angle of activation is transmitted to a transducer angle of the signal lever, wherein a proportional value between the angle of activation and the transducer angle can be adjusted by means of a configurable force application point between the transmission lever and the signal lever; and providing the transducer angle for a transmitter element of a sensor by means of the signal lever, which is pivoted about a second axis.

One aspect of the present disclosure is to provide a variable circuit with an integrated transmission system. Advantageously, it is possible to avoid a multiple development to accommodate different requirements regarding attainability and ergonomics, as well as the resulting angles of activation and actuating travel. For example, one model of the idea presented provides a shift actuation, which allows for different variations regarding angle of activation and actuating travel by using a uniform electronics and mechanical module.

BRIEF DESCRIPTION OF THE DRAWINGS

Subsequently, the current embodiments are described in more detail in an exemplary manner by means of the enclosed drawings. It is shown.

DETAILED DESCRIPTION

Figure 1:
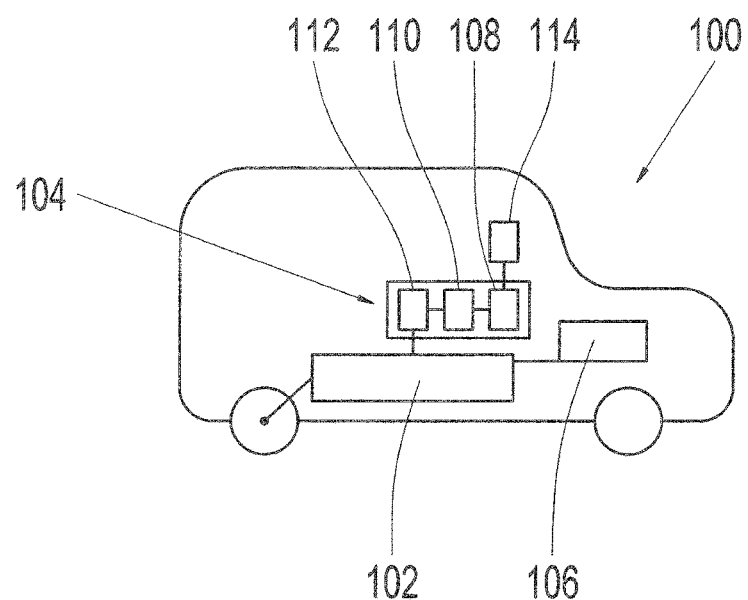
FIG. 1: a diagram of a vehicle with a vehicle transmission and a transmission device for a shift actuation of a vehicle transmission according to an embodiment of the present disclosure.

In the following description of preferred embodiments of the present disclosure, the same or similar reference numerals are used for components having a similar working mechanism that are shown in the different figures, wherein the description of the respective components is not repeated.

FIG. 1 shows a diagram of a vehicle 100 with a vehicle transmission 102 and a transmission device 104 for a shift actuation of the vehicle transmission according to an embodiment of the present disclosure. The vehicle 100 comprises a motor 106, which drives at least one axis of the vehicle 100 via a vehicle transmission 102. The transmission device 104 comprises a transmission lever 108, a drive device 110, as well as a signal lever 112. The vehicle transmission 102 comprises a plurality of transmission steps or a plurality of shifting programs, which can be adjusted by an actuating element 114 connected with the transmission device 104, which is designed in the embodiment shown in the form of a selector lever 114. The transmission lever 108 is designed to be rotated about a first axis in response to actuating the selector lever 114. When a rotation of the transmission lever 108 is completed, the transmission lever has assumed an angle of activation, which corresponds in this embodiment to the position of the selector lever 114, i.e., to an angle of activation of the selector lever 114. The drive device 110 is designed to transmit the movement of the transmission lever 108 to the signal lever 112, wherein the angle of activation is transmitted to a transducer angle of the signal lever 112. For this purpose, the signal lever 112 is pivoted about a second axis. A proportional value between the angle of activation and the transducer angle can be adjusted by means of a configurable force application point between the transmission lever 108 and the signal lever 112. According to this embodiment, the transducer angle has a value that is different from the angle of activation and represents the position of the selector lever 114. By means of the signal lever 112, it is possible to adjust the transducer angle for a transmitter element of a sensor. In this way, it is possible to detect by the sensor and via the transmission lever 108 and the signal lever 112 a current angle of activation of the selector lever 114.

Figure 2:
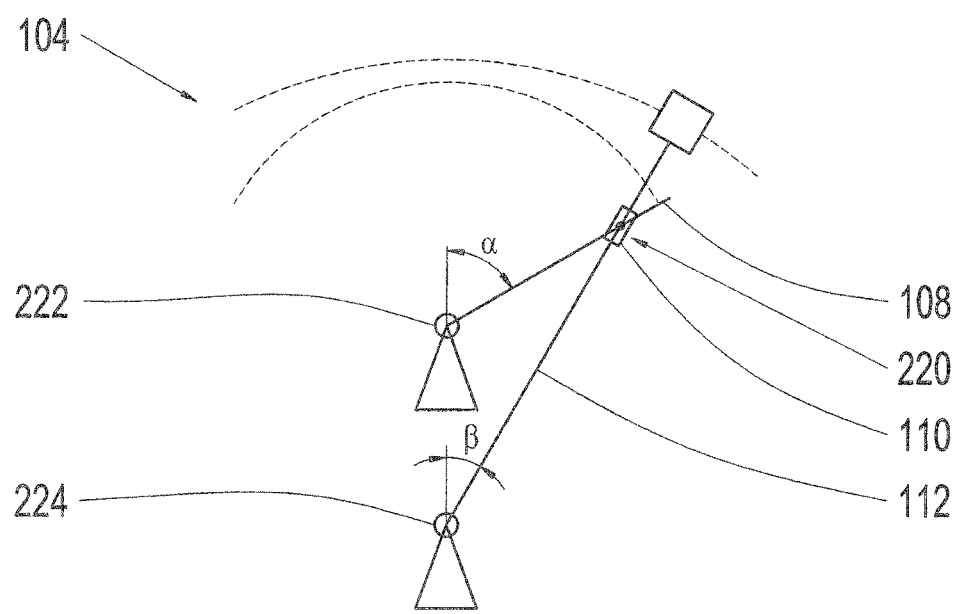
FIG. 2: a diagram of a transmission device of an angle of activation in a transducer angle for a shift actuation of a vehicle transmission according to an embodiment of the present disclosure.

FIG. 2 shows a diagram of a transmission device 104 of an angle of activation $\alpha$ to a transducer angle $\beta$ for a shift actuation of a vehicle transmission according to an embodiment of the present disclosure. The vehicle transmission can involve an embodiment of a vehicle transmission shown in FIG. 1 and depicted with the reference numeral 102. The transmission device 104 can involve a model of an embodiment of the transmission device 104 shown in FIG. 1. The transmission device comprises a transmission lever 108 and a signal lever 112, which are coupled via a drive device 110. In one embodiment, the drive device 110 is designed in the form of a thrust-loaded transmission. With one of the two levers 108, 112, i.e., with the transmission lever 108 or the signal lever 112, the drive device 110 is firmly connected to a force application point 220. With the other lever 112, 108, i.e., the signal lever 112 or the transmission lever 108, the drive device 110 is connected via a shear connector, which can be moved in linear direction along the lever 112, 108. The force application point 220 can be moved in linear direction in the shear connection. The drive device 110 couples the transmission lever 108 with the signal lever 112.

The transmission lever 108 is pivoted about a first axis 222. The signal lever is pivoted about a second axis. FIG. 2 does not show an interface for receiving an angle of activation $\alpha$. The drive device 110 is designed to transmit the angle of activation $\alpha$ adjusted by the transmission lever 108 to a transducer angle $\beta$ of the signal lever. In one embodiment, the position of the force application point 220 can be easily configured in relation to the transmission lever, and in a further embodiment, in relation to the signal lever. By changing the force application point 220 at the transmission lever 108, it is possible to adjust or configure a proportional value between the angle of activation $\alpha$ and the transducer angle $\beta$.

One aspect of the present disclosure involves the possibility of allowing for different variations regarding angle of activation and actuating travel by using a uniform electronics and mechanical module. In one embodiment, this objective is achieved with a transmission lever 112, which has a fixed point of rotation 222 and the force application point can be defined in variable manner. The resulting different lever ratios make it possible to represent different actuating travels at the operating area of the outer lever, which is transmitted to a movement of the signal transducer 112. The position of the actuating lever (shown in FIG. 1 with the reference numeral 114) is determined by means of a grid system.

This allows for a variant-independent same-part concept for the sensor unit. In addition, independent of the actual lever, a signal transducer (for example, a magnet) can be positioned in such a way that it results in a compact size of the overall system.

The practical application can be generated for a uniform shift-by-wire shift actuation, for which multiple different versions of actuation should be available. The type of signaling is not affected by the concept presented here. For example, it is possible to represent contact-dependent or non-contact sensors. The idea can be used for latching, as well as monostable actuation systems.

Figure 3:
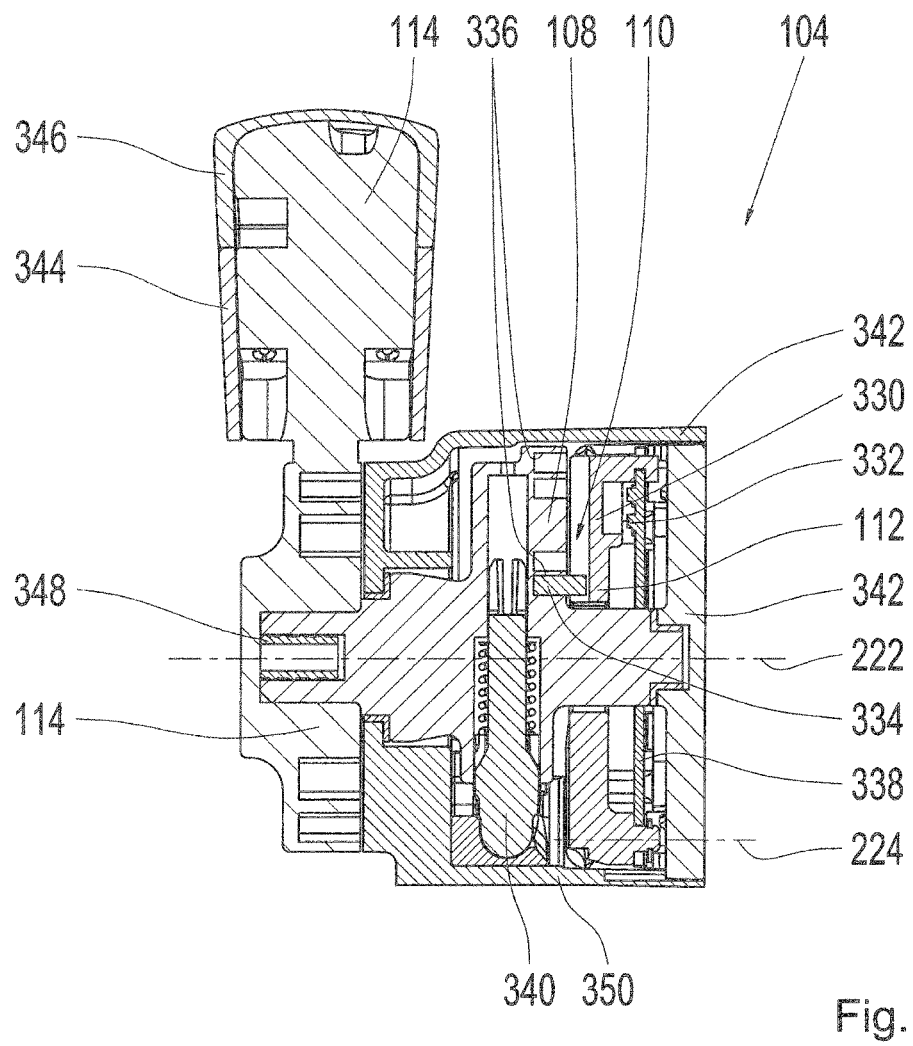
FIG. 3: a sectional view of a transmission device according to an embodiment of the present disclosure.

FIG. 3 shows a sectional view of a transmission device 104 according to an embodiment of the present disclosure.

The transmission device 104 can involve a model of the embodiment of a transmission device 104 shown in FIG. 1 or FIG. 2.

The transmission device 104 comprises a transmission lever 108, which is pivoted about a first axis 222 for receiving the angle of activation of the selector lever 114. Furthermore, the transmission device 104 comprises a signal lever 112, which is pivoted bout a second axis 224 for providing a transducer angle for a transmitter element 330, for example, a magnet, of a sensor 332. Finally, the transmission device 104 comprises a drive device 110, by means of which a movement of the transmission lever 108 is transmitted to the signal lever 112. As a result, the angle of activation can be transmitted to the transducer angle of the signal lever 112. At the same time, it is possible to configure a force application point between the transmission lever 108 and the signal lever 112 to adjust a proportional value between the angle of activation and the transducer angle.

The drive device 110 comprises a coupling element 334 in the form of a pin and an, especially linear, guide unit for the coupling element 334. The coupling element 334 is arranged in a receptacle 336 on the transmission lever 108. At the same time, the coupling element can be connected with the transmission lever 108 in detachable and non-detachable manner. The guide unit of the drive device is arranged on the signal lever 112. Alternatively, a coupling element can be arranged in a receptacle on the signal lever 112 and the guide unit on the transmission lever 108.

The transmission lever 108 comprises at least one further receptacle 336, here three receptacles 336. The receptacles 336 are designed in the form of pocket holes or drill holes. The receptacles 336 are arranged radially to the rotation axis of the transmission lever. The receptacles 336 are arranged at different spaces from the first axis 222. The coupling element 334 is arranged in one selected receptacle 336. Depending on the arrangement of the coupling element 334 in one of the receptacles 336, a different proportional value is adjusted between the angel of activation and the transducer angle.

A circuit board 338 is arranged next to the signal lever 112. At least one sensor 332 is arranged at the circuit board 338. The transmitter element 330 can be moved about the second axis 224 along a circular path over the circuit board 338 in a plane that is parallel in a tolerance range to the circuit board. According to this embodiment, the circuit board 338 has a plurality of sensors 332. The sensors 332 are arranged in a sensor field.

According to this embodiment, the transmission device 104 comprises a locking device 340. The locking device 340 blocks in a locked condition a movement of the transmission lever 108 or the signal lever 112. For this purpose, the locking device 340 engages in the locked condition in a locking recess of the transmission lever 108.

According to this embodiment, the transmission device 104 comprises a housing 342. The housing can consist of several parts. The axes 222, 224 are supported by the housing 342. As a result, the transmission lever 108 is supported by the housing 342 or pivoted about the first axis 222. Correspondingly, the signal lever 112 is supported by the housing 342 or pivoted about the second axis 224. In an alternative embodiment, the second axis 224 or the signal lever 112 is supported by the circuit board 338 or pivoted about the second axis. For this purpose, additional bearings are used in various embodiments.

The selector lever 114 of the transmission device 104 has a lower faceplate 344 and an upper faceplate 346. Together with the upper faceplate 346 and part of the selector lever 114, the lower faceplate 344 forms a gear knob, which can be operated, for example, by the driver of a vehicle.

In one embodiment, a screw 348 is arranged on the transmission device 108, the main extension direction or operating direction of which corresponds to the first axis 222. In one embodiment, the screw 348 is designed to connect the selector lever 114 with the transmission lever 108.

In one embodiment, a limit stop 350 is arranged at the housing 342, which limit stop 350 impacts the locking device 340, the transmission lever 108 or the locking device 340. In one embodiment, the limit stop 350 acts as a locking device.

Figure 4:
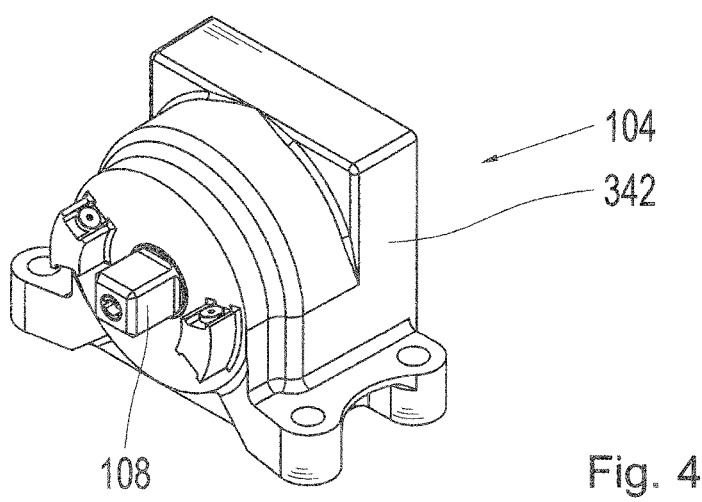
FIG. 4: A three-dimensional view of a transmission device according to an embodiment of the present disclosure.

FIG. 4 shows a three-dimensional representation of a transmission device 104 according to an embodiment of the present disclosure. The transmission device 104 can involve a model of the embodiment of a transmission device 104 shown in FIGS. 1 to 3. FIG. 4 shows the transmission device 104 in mounted condition and provided with a housing 342. An interface of the transmission angle 108 for receiving the angle of activation of the selector lever is protruding from the housing. The interface is designed in the form of a square insert with chamfered edges. The housing has screw holes to mount the transmission device 104 in a vehicle or on a vehicle transmission.

Figure 5:
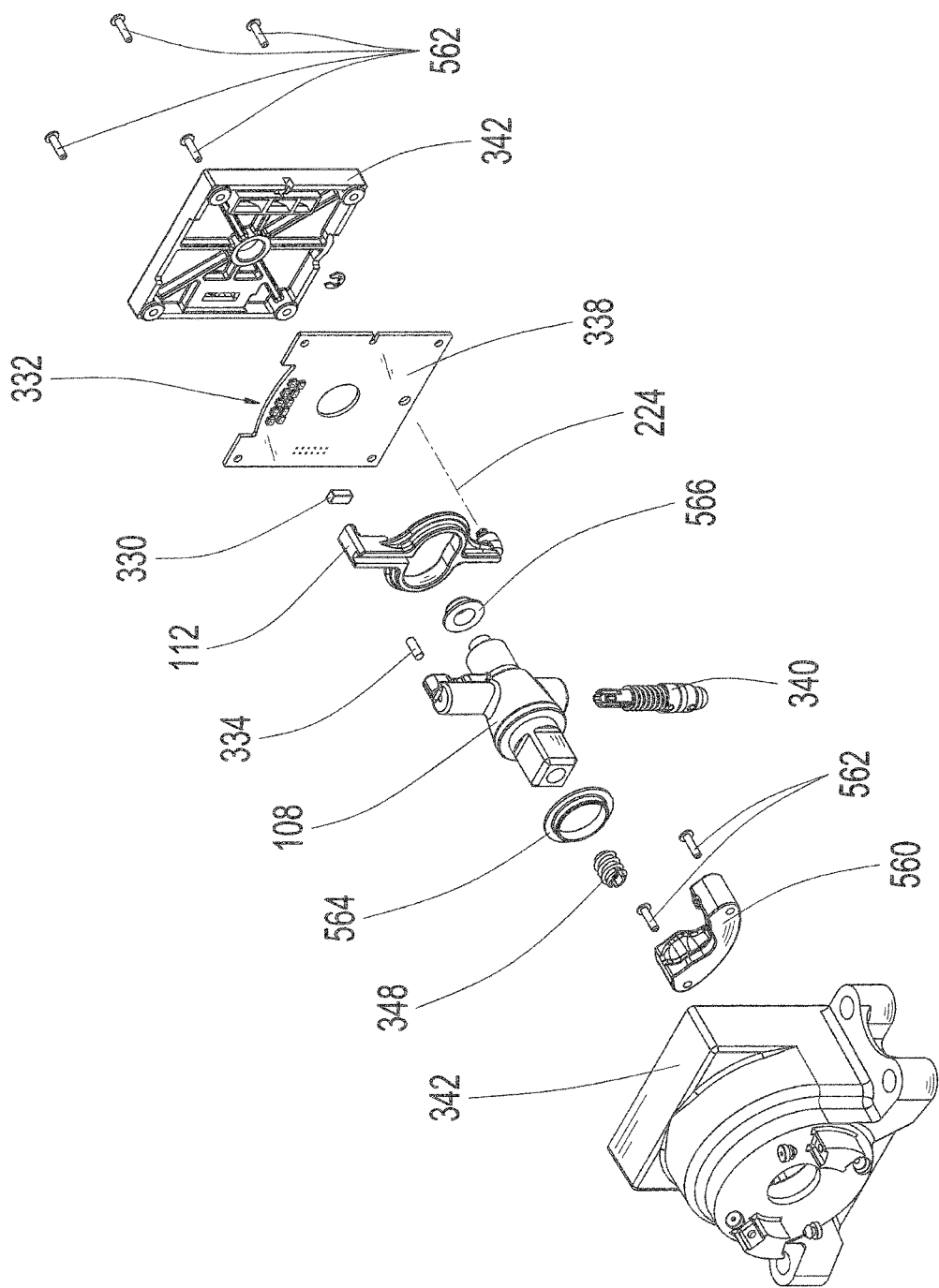
FIG. 5: an exploded view of a transmission device according to an embodiment of the present disclosure.

FIG. 5 shows an exploded view of a transmission device 104 according to an embodiment of the present disclosure. The transmission device 104 can involve a model of an embodiment of a transmission device shown in FIGS. 1 to 4. The exploded view shows the individual elements of a transmission device 104 shown in FIG. 3 or FIG. 4. The transmission device 104 comprises a first element of a housing 342, a bearing shell 560, two mounting screws 562 for fixing the bearing shell 560 to the housing 342, a screw 348, a bearing ring 564, a transmission lever 108, a locking device 340, a coupling element 334, a bearing ring 566, a signal lever 112, a transmitter element 330, a circuit board 338 with a plurality of sensors 332, as well as a second element of the housing 342, which can be fixed with four mounting screws 562 to the first element of the housing 342.

In the area of the second axis 224, the circuit board 338 has a recess in which the signal lever 112 can be arranged or mounted.

In the area of the first axis or rotation axis, the second element of the housing 342 has a pocket hole or through-hole. The bearing ring 566 can be arranged in the pocket hole or through-hole. As a result, the transmission lever can be mounted on bearing ring 566 and bearing ring 564.

Figure 6:
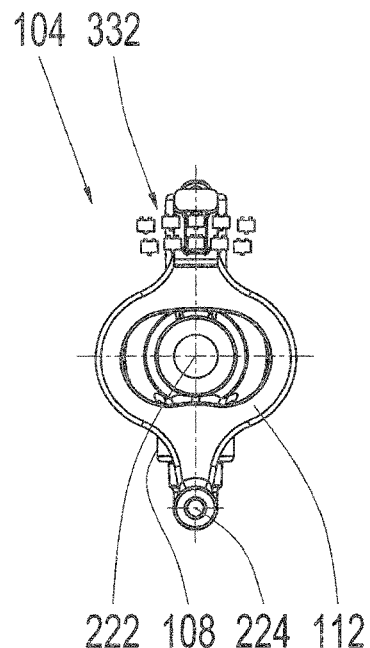
FIG. 6: a frontal view of a transmission device in a basic position according to an embodiment of the present disclosure.

FIG. 6 shows a frontal view of a transmission device 104 in a basic position according to an embodiment of the present disclosure. The transmission device 104 can involve a model of an embodiment of a transmission device 104 shown in FIGS. 1 to 5. In the embodiment, the first axis 222 and the second axis 224 are spaced apart 28 mm. On the second circuit board 338, at a space of 49 mm and 53 mm, respectively, away from the second axis, a plurality of sensors is arranged in a respective circular arc, wherein five sensors 332 are arranged in each circular arc. At the same time, two sensors 332 are respectively arranged at an identical angle. The signal lever 112 comprises a recess for implementing the transmission lever 108. The first axis 222 extends through this recess in the signal lever 112.

The measurements and angles mentioned in the description are only intended to be used in an exemplary manner.

Figure 7:
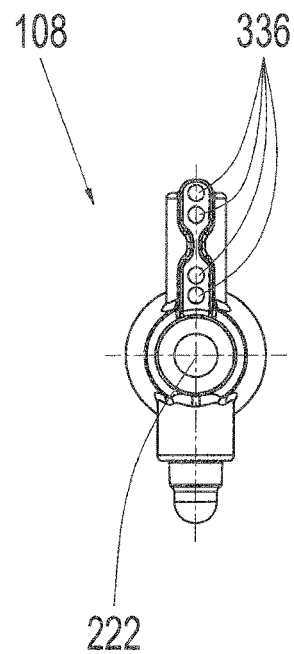
FIG. 7: a frontal view of a transmission device according to an embodiment of the present disclosure.

FIG. 7 shows a frontal view of a transmission lever 108 according to an embodiment of the present disclosure. The transmission lever 108 can involve a model of the embodiment of a transmission lever 108 shown in FIG. 6. The transmission lever 108 comprises four receptacles 336 for a coupling element of a drive device of a transmission device. A first receptacle 336 is arranged at a space of 11.1 mm away from the first axis 222, a second receptacle 336 is arranged at a space of 14.8 mm away from the first axis 222, a third receptacle 336 is arranged at a space of 26 mm away from the first axis, and a fourth receptacle 336 is arranged at a space of 30 mm away from the first axis 222. The receptacles 336 are designed in the form of pocket holes.

Figure 8:
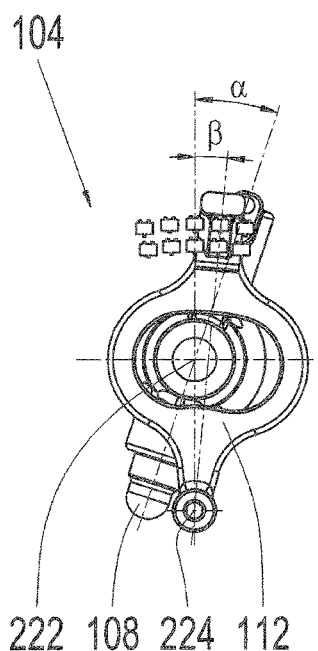
FIG. 8: a frontal view of a transmission device in a first angle of activation according to an embodiment of the present disclosure.

FIG. 8 shows a frontal view of a transmission device 104 at a first angle of activation according to an embodiment of the present disclosure. The transmission device 104 can involve a model of the embodiment of a transmission device 104 shown in FIG. 6 or FIG. 7. The transmission lever 108 is arranged at an 18.3° angle of deflection. The signal lever 112 is arranged at a 5.17° angle of deflection from the basic position shown in FIG. 6. As a result, the angle of activation in the embodiment shown in FIG. 8 amounts to α=18.3° and the transducer angle β=5.17°.

Figure 9:
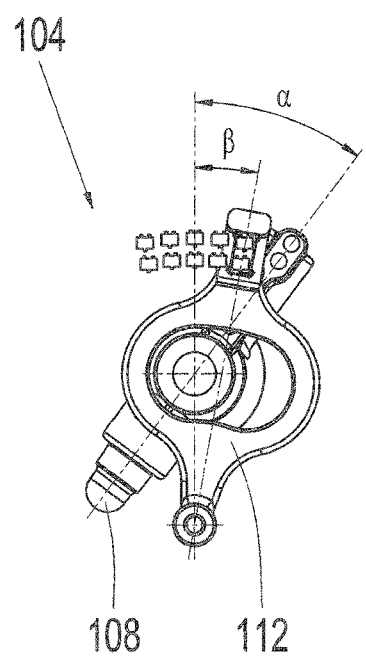
FIG. 9: a frontal view of a transmission device in a second angle of activation according to an embodiment of the present disclosure.

FIG. 9 shows a frontal view of a transmission device in a second angle of activation according to an embodiment of the present disclosure. The transmission device 104 can involve a model of the embodiment of a transmission device 104 shown in FIGS. 6 to 8. The transmission lever 108 is arranged at an 36.6° angle of deflection. The signal lever 112 is arranged at a 10.16° angle of deflection from the basic position shown in FIG. 6. As a result, the angle of activation in the embodiment shown in FIG. 8 amounts to α=36.6° and the transducer angle β=10.16°.

FIGS. 6 to 9 show an embodiment of a transmission device in which a plurality of sensors 332 are arranged on a circuit board along a circular arc, wherein an angle of 5.17° is formed between the transducer angles β as a result of the arrangement of the sensors.

Figure 10:
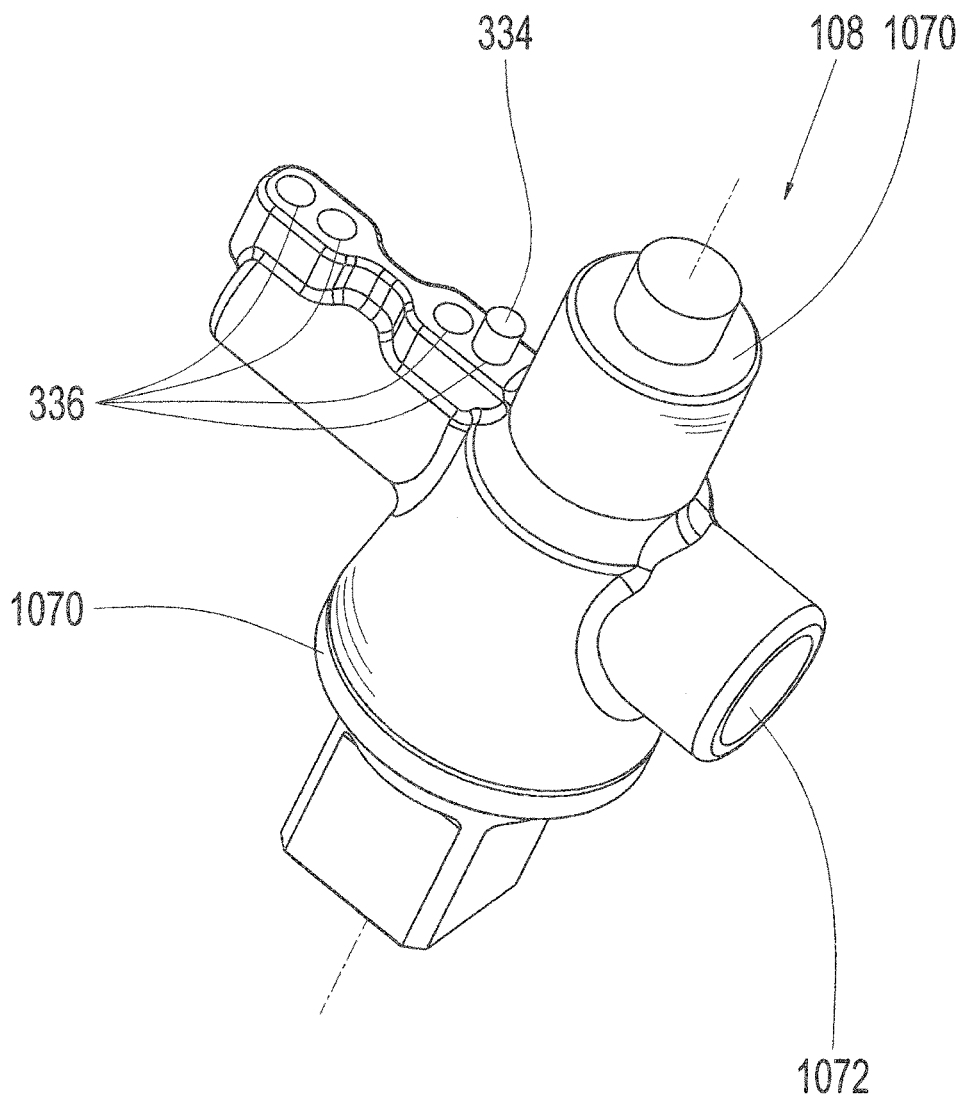
FIG. 10: a three-dimensional view of a transmission device according to an embodiment of the present disclosure.

FIG. 10 shows a three-dimensional view of a transmission lever 108 according to an embodiment of the disclosure. The transmission lever 108 can involve a model of the embodiment of a transmission lever 108 shown in the preceding figures. The transmission lever 108 is designed in such a way that two counter bearings 1070 are formed. The counter bearings are arranged in correspondence to a rotation axis of the transmission lever 108. In addition, the transmission lever 108 has three receptacles 336 for a coupling element 334. The three receptacles 336 are arranged on one arm radially to the rotation axis of the transmission lever 108, wherein the rotation axis is determined by the two counter bearings 1070. A coupling element 334 is arranged in the receptacle 336 located next to the rotation axis. The receptacles 336 are designed in the form of drill holes or pocket holes, the coupling element 334 is designed in the form of a pin or a bolt. On the side located opposite of the rotation axis of the receptacles 336, the transmission lever 108 has on one arm a locking recess 1072, which is designed to receive a blocking element so as to be able to prevent a rotation of the transmission lever 108.

Figure 11:
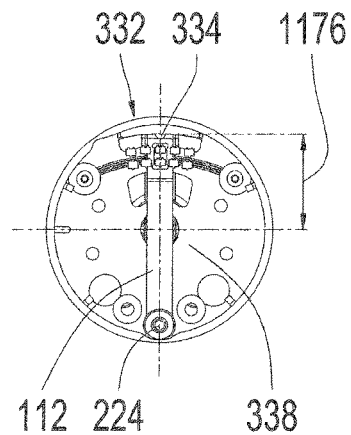
FIG. 11 to FIG. 19: diagrams of a circuit board with a signal lever arranged in the front according to an embodiment of the present disclosure.
Figure 12:
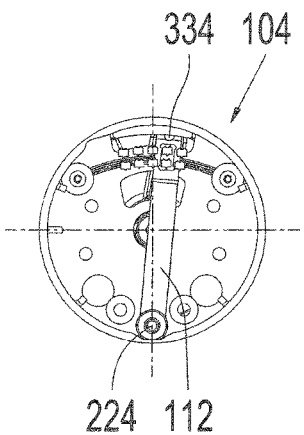
Figure 13:
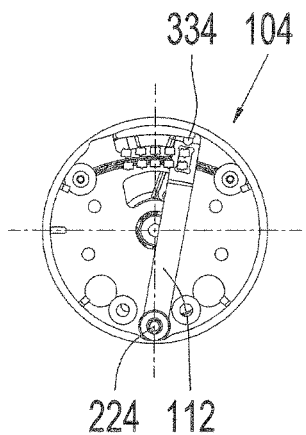
Figure 14:
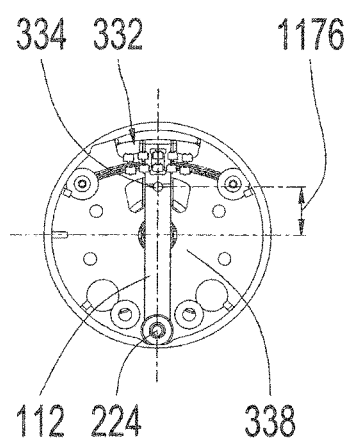
Figure 15:
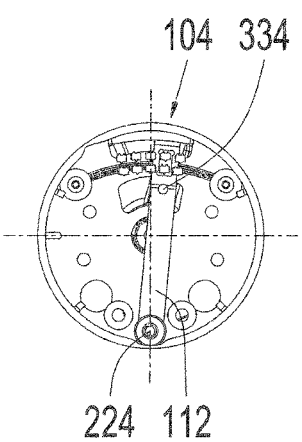
Figure 16:
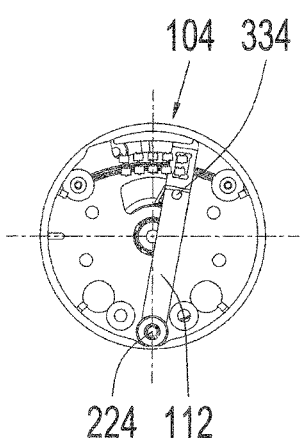
Figure 17:
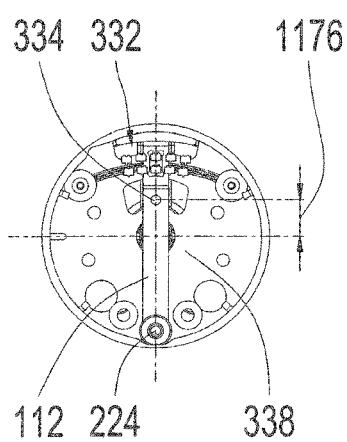
Figure 18:
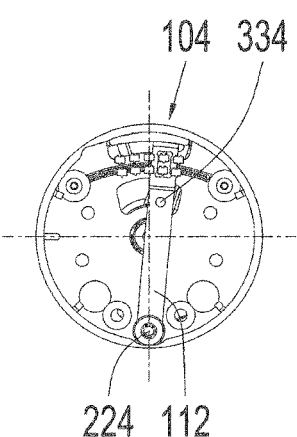
Figure 19:
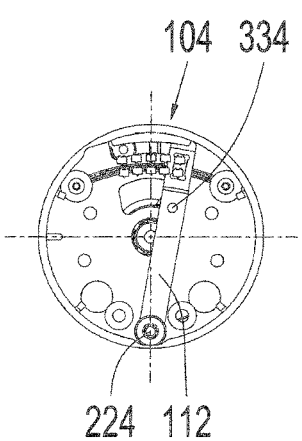

FIGS. 11 to 19 show a diagram of a circuit board 338 with a signal lever 112 arranged in the front according to an embodiment of the present disclosure. The circuit board 338 can involve a model of the embodiment of a circuit board 338 of the transmission device 104 shown, for example, in FIGS. 5 to 9. The circuit board 338 has a round shape. A signal lever 112 is pivoted about a second axis 224, which is basically arranged perpendicular to the circuit board 338. A plurality of sensors 332 are arranged in such a way that they appear in pairs in a position of the transmitter element, which is respectively assigned to a transducer angle. Five different positions can be observed in which, in one embodiment, their transducer angles always differ from one another by a fixed value. In the embodiment shown, the angular differences which can be dissolved by the plurality of sensors amount to 5.17°, as is depicted in FIG. 8 or FIG. 9. In FIGS. 11 to 13, this corresponds to an angle of activation of 10°, in FIGS. 14 to 16 to an angle of activation of 15°, and in FIGS. 17 to 19 to an angle of activation of 18.3°. The different proportional value between the angle of activation and the transducer angle shown in the embodiments is achieved by changing the arrangement of a coupling element 334. For example, the arrangement of the coupling element 334 in the embodiment of a transmission lever 108 shown in FIG. 10 corresponds to the receptacle 336 shown in the representation in FIGS. 11 to 13 to be radially most distant from the first axis 222, in the representation in FIGS. 14 to 16 the central receptacle 336, and in the representation in FIGS. 17 to 19 the receptacle 336 closest to the first axis 222. The space between the force application point and the second axis 224, or between the coupling element 334 and the second axis 224, is provided with the reference numeral 1176.

FIGS. 20 to 28 show a diagram of a transmission device 104 according to an embodiment of the present disclosure. The transmission device 104 can involve a model of the embodiment of a transmission device 104 shown in the preceding figures. The FIGS. 20 to 28 comprise an analogy to FIGS. 11 to 19. FIGS. 20 to 28 show a respective transmission device 104 in mounted condition in viewing direction along the first axis 222, wherein a signal lever 112 and behind it a transmission lever 108 are shown behind a second element of the housing 342. A coupling element 334 is depicted by a black dot.

Figure 20:
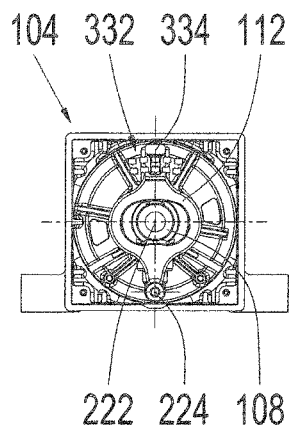
FIG. 20 to FIG. 28: diagrams of a transmission device according to an embodiment of the present disclosure.
Figure 21:
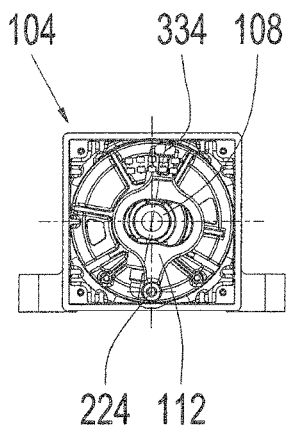
Figure 22:
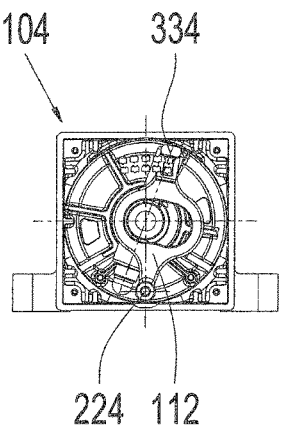
Figure 23:
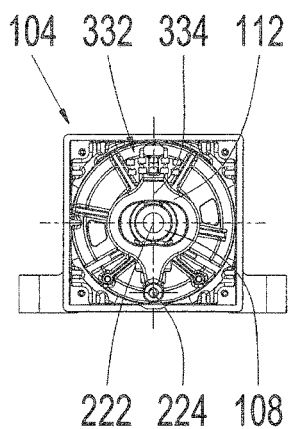
Figure 24:
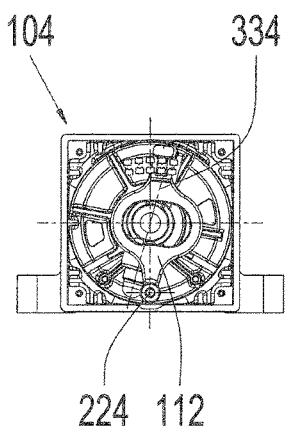
Figure 25:
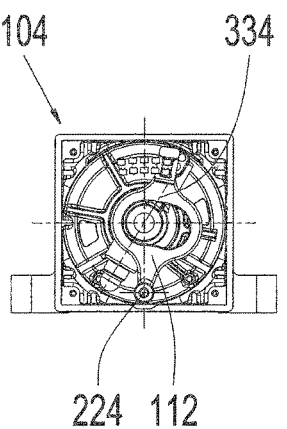
Figure 26:
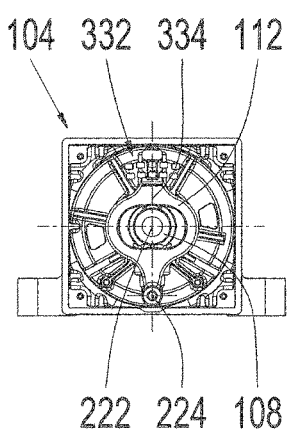
Figure 27:
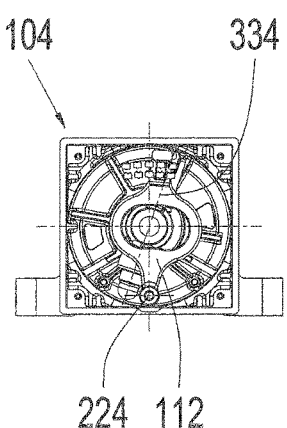
Figure 28:
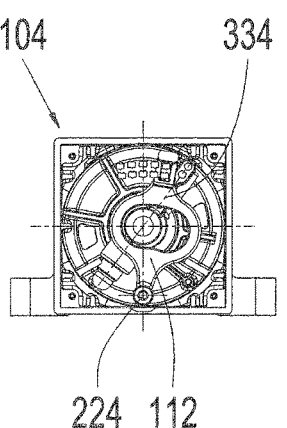

The signal lever 112 is pivoted about the second axis 224, which is aligned basically parallel to the first axis 222. A plurality of sensors 332 are arranged in such a way that a position of the transmitter lever 112 assigned to a transducer angle always appears in pairs. Five different positions can be observed in which, in one embodiment, their transducer angles always differ from one another by a fixed value. In the embodiment shown, the angular differences which can be dissolved by the plurality of sensors amount to 5.17°, as is depicted in FIG. 8 or FIG. 9. In FIGS. 20 to 22, this corresponds to an angle of activation of 10°, analogous to FIGS. 11 to 13. In FIGS. 23 to 25, this corresponds to an angle of activation of 15°, analogous to FIGS. 14 to 16. And in FIGS. 26 to 28, this corresponds to 19 to an angle of activation of 18.3°, analogous to FIGS. 17 to 19. The different proportional value between the angle of activation and the transducer angle shown in the embodiments is achieved by changing the arrangement of a coupling element 334. For example, the arrangement of the coupling element 334 in the embodiment of a transmission lever 108 shown in FIG. 10 corresponds to the receptacle 336 shown in the representation in FIGS. 20 to 22 to be radially most distant from the first axis 222, in the representation in FIGS. 23 to 25 the central receptacle 336, and in the representation in FIGS. 26 to 28 the receptacle 336 closest to the first axis 222.

Figure 29:
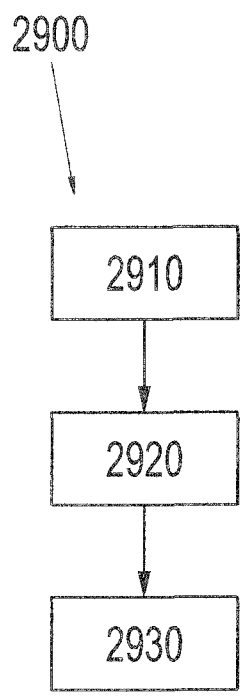
FIG. 29: a flow diagram of a method to produce a transmission device according to an embodiment of the present disclosure.

FIG. 29 shows a flow diagram of a method 2900 for producing a transmission device according to an embodiment of the present disclosure. The transmission device can involve an embodiment of a transmission device 104 shown in FIGS. 1 to 5, or parts or partial aspects shown in FIGS. 6 to 28. The method 2900 for producing a transmission device for transmitting an angle of activation of a selector lever for a shift actuation of a vehicle transmission comprises a step 2910 of providing a transmission lever and, in addition or alternatively, a drive device, a step of configuring a force application point of the drive device between the transmission lever and the signal lever to adjust a proportional value between the angle of activation and a transducer angle of the signal lever, as well as a step 2930 of arranging the transmission lever and, in addition or alternatively, the drive device and, in addition or alternatively, the signal lever, wherein the transmission lever is pivoted about a first axis to receive the angle of activation of the selector lever, wherein the signal lever is pivoted about a second axis to provide the transducer angle for a transmitter element of a sensor, and wherein the drive device couples the transmission lever with the signal lever to transmit the angle of activation to the transducer angle of the signal lever.

Figure 30:
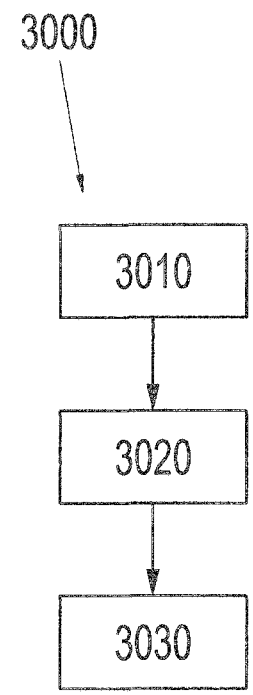
FIG. 30: a flow diagram of a method to transmit an angle of activation of a selector lever for a shift actuation of a vehicle transmission according to an embodiment of the present disclosure.

FIG. 30 shows a flow diagram of a method 3000 for transmitting an angle of activation of a selector lever for a shift actuation of a vehicle transmission according to an embodiment of the present disclosure. The transmission device can involve a model of an embodiment of a transmission device 104 shown in FIGS. 1 to 5, or parts or partial aspects shown in FIGS. 6 to 28. The method 3000 for transmitting an angle of activation of the selector lever for a shift actuation of a vehicle transmission comprises step 3010 of rotating the transmission lever about a first axis in response to an actuation of the selector lever to adjust an angle of activation, step 3020 of transmitting the movement of the transmission lever to a signal lever, wherein the angle of activation is transmitted to a transducer angle of the signal lever, wherein a proportional value between the angle of activation and the transducer angle can be adjusted by means of configurable force application point between the transmission lever and the signal lever, as well as step 3030 of providing the transducer angle for a transmitter element of a sensor by means of the signal lever, which is pivoted about a second axis.

The embodiments described and shown in the figures are selected merely for the purpose of providing examples. It is possible to combine different embodiments as a whole or with regard to specific characteristics. It is also possible to supplement an embodiment with characteristics of a further embodiment.

Furthermore, it is possible to repeat the disclosed procedural steps or implement them in a different sequence than the one described.

If an embodiment has a "and/or" combination between a first characteristic and a second characteristic, this can be understood in such a way that the embodiment, according to one form of application, can comprise the first, as well as the second characteristic and, according to another form of application, it can comprise only the first characteristic or only the second characteristic.

100 vehicle
102 vehicle transmission
104 transmission device
106 motor
108 transmission level
110 drive device
112 signal lever
114 actuating element
220 force application point
222 first axis
224 second axis
α angle of activation
β transducer angle
330 transmitter element
332 sensor
334 coupling element
336 receptacle
338 circuit board
340 locking device
342 housing
344 lower faceplate
346 upper faceplate
348 screw
350 limit stop
560 bearing shell
562 mounting screws
564 bearing ring
566 bearing ring
1070 counter bearing
1072 locking recess
1176 space between the force application point and the first axis
2900 method
2910 step of providing
2920 step of configuring
2930 step of arranging
3000 method
3010 step of rotating
3020 step of transmitting
3030 step of providing

We claim:

1. A transmission device for transmitting an angle of activation of a selector lever for a vehicle transmission, wherein the selector lever can assume a plurality of angles of activation, the transmission device comprising:
   a transmission lever, wherein the transmission lever is rotatable about a first axis and is configured to receive the angle of activation of the selector lever;
   a signal lever, wherein the signal lever is rotatable about a second axis and is configured to provide a transducer angle to a transmitter element of a sensor; and
   a drive device connected to a force application point between the transmission lever and the signal lever, the drive device coupling the transmission lever with the signal lever, wherein the drive device is configured to transmit the angle of activation received by the transmission lever to the transducer angle provided by the signal lever,
   wherein a position of the force application point can be changed with respect to at least one of the transmission lever and the signal lever to adjust a proportional value between the angle of activation and the transducer angle.

2. The transmission device according to claim 1, wherein the drive device comprises a coupling element and a guide unit for the coupling element, wherein the coupling element is located in a first receptacle on the transmission lever, and wherein the guide unit is located on the signal lever.

3. The transmission device according to claim 2, wherein the coupling element comprises at least one of a pin and a bolt.

4. The transmission device according to claim 2, wherein the transmission lever includes a second receptacle, wherein the first receptacle and the second receptacle are arranged radially with respect to the first axis, and wherein the first receptacle and the second receptacle are located at different distances from the first axis.

5. The transmission device according to claim 1, wherein the transmitter element includes at least one magnet arranged on the signal lever.

6. The transmission device according to claim 1, wherein a circuit board is arranged adjacent to the signal lever, wherein the sensor is arranged adjacent to the circuit board, and wherein the transmitter element is configured to move along a circular path over the circuit board.

7. The transmission device according to claim 1, wherein a locking device is configured to block a movement of at least one of the transmission lever and the signal lever is a locked state, and wherein the locking device is configured to assume the locked state in a locking recess of the transmission lever.

8. The transmission device according to claim 1, further comprising a housing, wherein at least one of the first axis and the second axis is supported by the housing.

9. A method for producing a transmission device for transmitting an angle of activation of a selector lever for a shift actuation of a vehicle transmission, the method comprising:
providing a transmission lever, a signal lever, and a drive device, wherein the transmission lever is rotatable about a first axis and is configured to receive the angle of activation of the selector lever, wherein the signal lever is rotatable about a second axis and is configured to provide a transducer angle to a transmitter element of a sensor, and wherein the drive device is configured to transmit the angle of activation received by the transmission lever to the transducer angle provided by the signal lever; and
selecting a location of a force application point of the drive device between the transmission lever and the signal lever to select a proportional value between the angle of activation and a transducer angle of the signal lever.

10. The method according to claim 9, wherein a circuit board is arranged adjacent to the signal lever, wherein the sensor is arranged adjacent to the circuit board, and wherein the transmitter element is configured to move along a circular path over the circuit board.

11. The method according to claim 9, wherein the drive device comprises a coupling element and a guide unit for the coupling element, wherein the coupling element is located in a first receptacle on the transmission lever, and wherein the guide unit is located on the signal lever.

12. The method according to claim 11, wherein the coupling element comprises at least one of a pin and a bolt.

13. The method according to claim 11, wherein the transmission lever includes a second receptacle, wherein the first receptacle and the second receptacle are arranged radially with respect to the first axis, and wherein the first receptacle and the second receptacle are located at different distances from the first axis.

14. The method according to claim 9, wherein the transmitter element includes at least one magnet arranged on the signal lever.

15. A method for transmitting an angle of activation of a selector lever for of a vehicle transmission the method comprising:
rotating a transmission lever about a first axis in response to an actuation of the selector lever;
transmitting the movement of the transmission lever to a signal lever to transmit the angle of activation to a transducer angle of the signal lever, wherein the signal lever is rotatable about a second axis, and wherein a proportional value between the angle of activation and the transducer angle is adjusted by changing a location of a force application point between the transmission lever and the signal lever; and
providing the transducer angle to a transmitter element of a sensor with the signal lever.

16. The method according to claim 15, wherein drive device couples the transmission lever with the signal lever, wherein the drive device comprises a coupling element and a guide unit for the coupling element, wherein the coupling element is located in a first receptacle on the transmission lever, and wherein the guide unit is located on the signal lever.

17. The method according to claim 16, wherein the coupling element comprises at least one of a pin and a bolt.

18. The method according to claim 16, wherein the transmission lever includes a second receptacle, wherein the first receptacle and the second receptacle are arranged radially with respect to the first axis, and wherein the first receptacle and the second receptacle are located at different distances from the first axis.

19. The method according to claim 15, wherein the transmitter element includes at least one magnet arranged on the signal lever.

20. The method according to claim 15, wherein a circuit board is arranged adjacent to the signal lever, wherein the sensor is arranged adjacent to the circuit board, and wherein the transmitter element is configured to move along a circular path over the circuit board.

* * * * *